April 1, 1930.  W. H. GREEN  1,752,339
PROCESS AND APPARATUS FOR SOFTENING WATER
Filed July 19, 1924  2 Sheets-Sheet 2
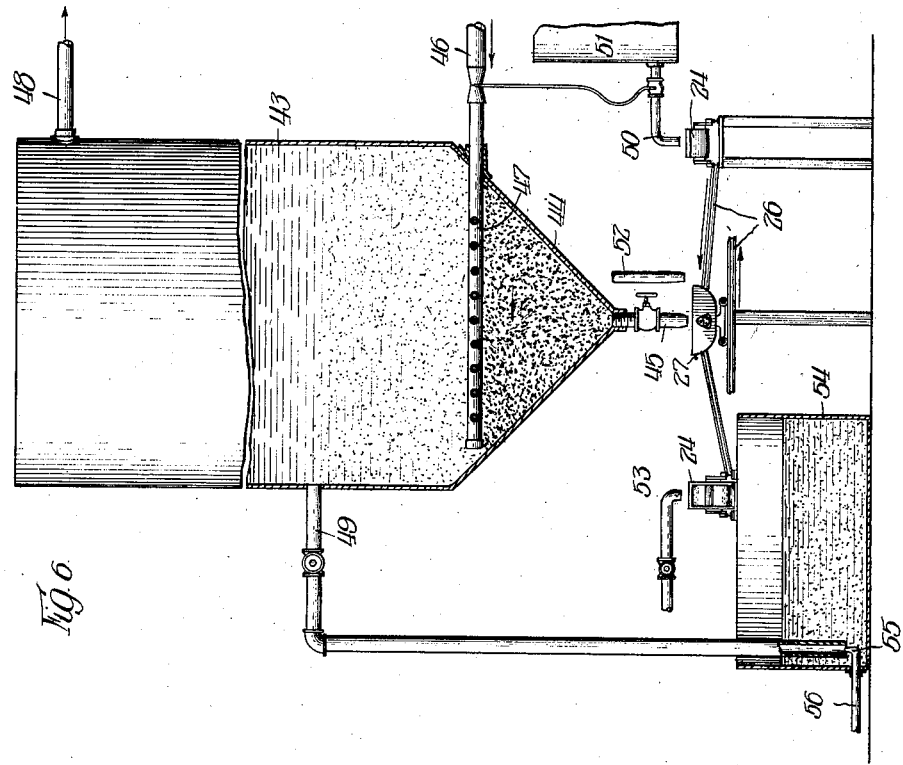
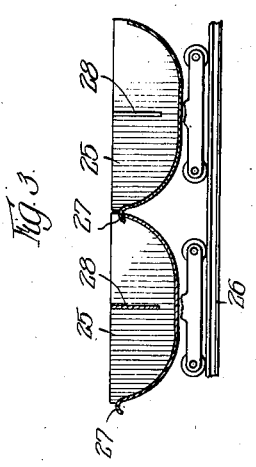
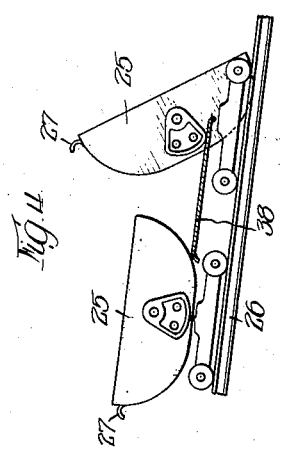
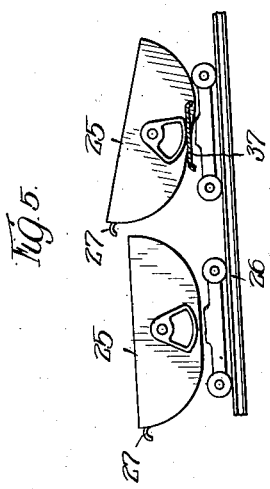
Witness:
P. Burkhardt.
Inventor:
Walter H. Green,
By Cromwell, Greist & Warden
attys.

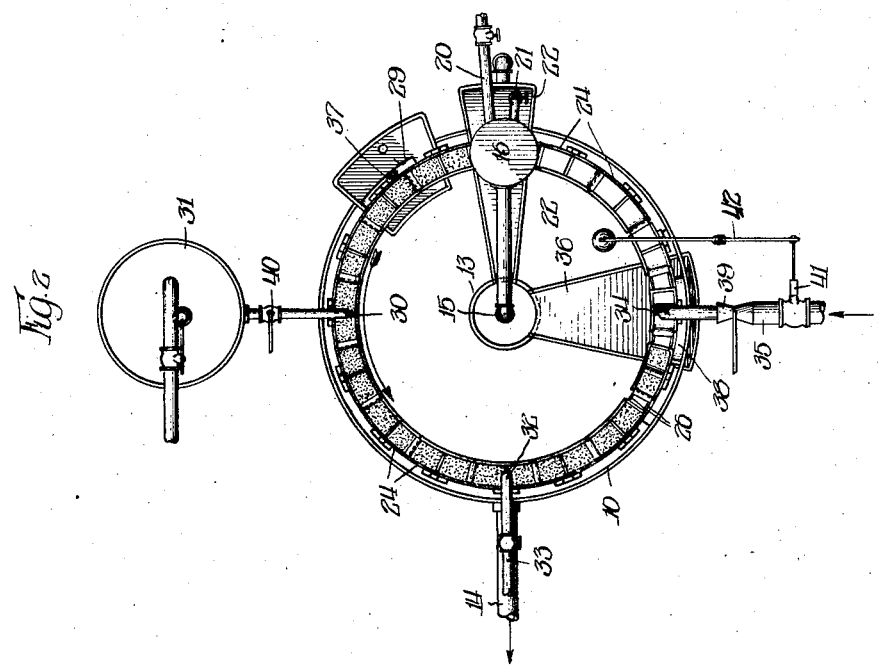
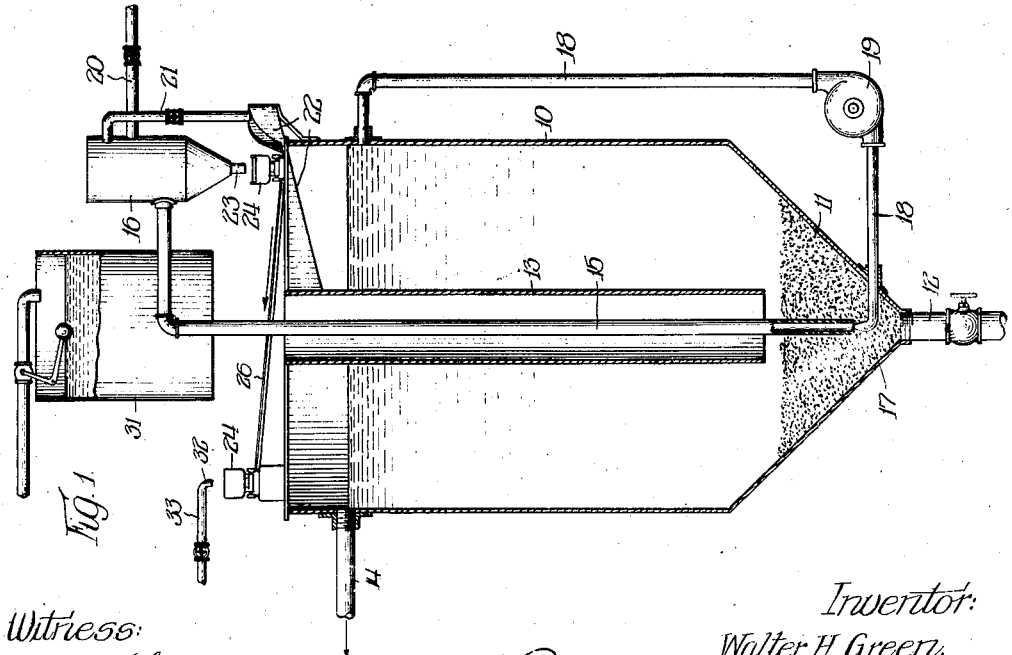

Patented Apr. 1, 1930

1,752,339

UNITED STATES PATENT OFFICE

WALTER H. GREEN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

PROCESS AND APPARATUS FOR SOFTENING WATER

Application filed July 19, 1924. Serial No. 726,930.

This invention relates to the art of softening water by the base exchange or zeolite method and has particular reference to apparatus and procedure for effecting economies in operation and maintenance through better utilization of the zeolites and of the regenerating solution.

Heretofore in the softening of water by the base exchange method, it has been customary to provide a casing, either open or closed, supplied with a bed of zeolites disposed on a suitable support, the dimensions of the bed being determined by the hardness of the water to be softened, the quantity of soft water required during a stated period, the density and capacity of the zeolites used, and the rate of flow permissible through the casing. In the operation of a typical softener of the prior art, hard water and a sodium chloride solution for regenerating the zeolites are passed alternately through the bed of zeolites, suitable valves and piping being provided to direct and control the respective flows.

In some cases the flow of hard water and of the regenerating solution has been downward through the zeolites, in other cases upward, and in still other instances the hard water is passed downwardly and the regenerating solution upwardly. Downward softening has been employed in most installations as the results with upward flow have not been uniform due to a lack of understanding of the requirements for proper operation.

In the exchange of bases which is brought about to soften water, the calcium and magnesium in solution in the water, and which constitute the hardening elements to be eliminated, are withdrawn in passing through a bed of sodium zeolites, the sodium being given up by the zeolites for the calcium and magnesium in the water. In the step of regeneration, sodium is restored to the zeolites in exchange for the calcium and magnesium taken from the hard water by subsequently passing a solution of sodium chloride through the zeolites. In both cases the exchange results from mere contact and is very rapid, the chief problem heretofore having been to effect contact with the bed.

It has been demonstrated that in softeners of the type referred to, certain portions of the bed are more active than others, both in softening and in regeneration. There is involved the problem of channeling or peferential passage of the water after it has entered the bed, thus placing the burden on some parts of the bed more than on others.

In regeneration, the general practice has been to pass through the bed a sodium chloride solution of uniform strength at a calculated rate of flow, in some cases the bed being treated for several hours. Satisfactory and economical regeneration has not been achieved, due to the length of time required, the waste of unused salt and the failure to regenerate evenly and uniformly throughout the bed. The whole operation has been open to the criticism that during regeneration the unit is incapable of delivering softened water, and further, that with a stationary bed, only a portion of it is capable of functioning to its full capacity, with the result that with softeners of this type, in order to meet the requirement for an output of stated quantities of softened water during a given period of time, it is necessary to provide beds of greater dimensions and consequently casings of larger size than are necessary.

I have found that economies in time and space, the cost of installation, maintenance and operation, and particularly in the consumption of salt, may be effected by departing from the idea of intermittently regenerating a stationary bed of zeolites, and by modifying the practice of bringing fresh regenerating solution into contact with zeolites in varying stages of exhaustion.

The principal object of the invention is to provide a water softener in which the regeneration of the zeolites is done automatically, without interrupting or interfering with the delivery of softened water and in such manner that in the formation and introduction of brine for regenerating purposes, the potentially stronger portion of the solution is presented to zeolites only slightly contaminated while the relatively weaker portions are brought into contact with the more thoroughly exhausted zeolites. In other words the regeneration is carried on in accordance with the counter-current principle.

A further object of the invention is to increase the delivery of softened water through utilization of the full capacity of the zeolites, this being accomplished by passing the water upwardly through the bed at a rate of flow which will expand the bed sufficiently to place it in suspension.

A still further object of the invention is to vary the delivery of softened water to conform with the consumption, while using the same upward-flow apparatus and while maintaining the zeolites therein at the most efficient degree of suspension, this being accomplished, when a slow delivery is desired, by using zeolites of a uniformly small size, and, when a fast delivery is desired, by using zeolites of a uniformly large size.

Other objects and advantages will be referred to in the course of the following detailed description of apparatus which forms a part of the invention, as the basis for which I have illustrated in the accompanying drawings what I now consider to be a preferred embodiment, and also a modification in structure and arrangement. Other forms of apparatus embodying similar principles of construction and operation may occur to those skilled in the art as being equally suitable for carrying on the purposes of the invention. The disclosure herein is to be understood as being for the purpose of exemplification and not in any sense a suggestion that other forms of apparatus are not possible or contemplated within the spirit and scope of the invention as defined in the appended claims.

In the drawings—

Fig. 1 is a vertical section taken diametrically through one form of the apparatus;

Fig. 2 is a plan view of the same;

Fig. 3 is a vertical section taken longitudinally through two of the receptacles used in the regeneration of the zeolites;

Fig. 4 is a side elevation of two of the receptacles when at that point on the track where each of the receptacles in turn is tilted;

Fig. 5 is a side elevation of two of the receptacles when at that point on the track where each of the receptacles in turn is partially tilted; and Fig. 6 is a vertical section taken diametrically through another form of the apparatus.

That form of the invention illustrated in Figs. 1 and 2 will first be described.

The water-softening portion of the apparatus includes a casing 10 having a conical bottom 11 which terminates centrally in a normally closed clean-out conduit 12. The casing 10 is provided interiorly with an open-ended stack 13 which extends downwardly to a point adjacent the bottom of the casing. The hard water and the active zeolites are introduced into the top of the stack by means which will be hereinafter described, and the water is softened effectively by contact with the diffused zeolites during the downward movement of the mixture in the stack. When the water and the zeolites emerge from the bottom of the stack into the bottom of the casing, the then softened water moves upwardly in the casing to a point adjacent the top of the same where it leaves through a softened water conduit 14, and the then exhausted zeolites, together with any foreign solids introduced into the stack with the hard water, collect in the bottom of the casing.

The manner in which the softening of the water is achieved in that portion of the apparatus thus far described, is but one application of a novel process which I have discovered for utilizing zeolites, and consists in effecting the exchange of bases while the zeolites are in suspension in the water, as distinguished from such softening processes of the prior art as those wherein the water is forced under pressure through a bed of the zeolites which is maintained as a foraminous unit on its support.

The zeolite-regenerating portion of the apparatus includes a conduit 15 which extends upwardly through the stack, from a point below the surface of the exhaust zeolites in the bottom, where the conduit opens, to a point above the casing, where the conduit discharges its contents into a small dividing tank 16. The exhausted zeolites in the bottom of the casing are caused to move upwardly in the conduit 15 by means of a constricted flow of water which is directed into the lower end of the conduit 15 from an injector nozzle 17. The nozzle 17 is mounted adjacent the entrance of the conduit 15 on the lower end of a conduit 18, which leads upwardly on the outside of the casing and communicates with the interior of the same at a point below the surface of the softened water therein. A suitable pressure pump 19 is included in the conduit 18 for effecting a rapid flow of water through the same.

The tank 16, which receives the exhausted zeolites and the water used to elevate the same, is provided with a conduit 20 through which the foreign solids mixed with the zeolites in the casing are carried off to a sewer, with a conduit 21 above the waste conduit 20 through which the bulk of the water entering the tank is returned to the casing by way of an inclined trough 22 leading into the stack 13, and with a bottom orifice 23 through which the exhausted zeolites, which settle to the bottom, are discharged into a moving zeolite conveyor 24.

The conveyor 24 consists of a plurality of wheeled receptacles 25 (see Figs. 3, 4 and 5) which are serially linked together and travel about a circular track 26 on the top of the casing 10. Each receptacle has a lip 27 at one end which laps over the adjacent end of the adjoining receptacle, and has a transverse baffle 28 between its ends which is spaced from its bottom, whereby, when a liquid is poured into the uppermost of several receptacles which are supported on an inclined portion of the track, the same will flow through each of such receptacles in a tortuous course extending alternately over the lips and below the baffles. Any suitable means may be used for moving the receptacles about the track, and such movement may be either continuous or intermittent, depending upon the manner in which the associated portions of the apparatus are designated to operate. Each receptacle, in its movement about the track, passes first below the orifice 23 of the tank 16, then over a catch basin 29 which empties into the sewer, then up a gradual inclination to a point below a nozzle 30 which is connected with a regenerating solution tank 31, then farther up the inclination to a point below a nozzle 32 which is connected with a wash water conduit 33, then down an inclination to a point below a nozzle 34 which is connected with the main hard water conduit 35 and above a wide trough 36 which opens into the top of the stack 13, and then back again to the starting point below the orifice 23. Each receptacle is tiltable on its under carriage, and is caused to tilt slightly by means of a trip 37 when it passes over the catch basin 29, as shown in Fig. 5, and to tilt fully by means of a trip 38 as it passes below the nozzle 34, as shown in Fig. 4. Other conveying systems or means than those shown may be utilized.

The receptacles 25 receive the exhausted zeolites as they pass below the orifice 23 of the tank 16, and subsequently discharge the regenerated zeolites as they pass above the trough 36, the regeneration of the zeolites taking place during the movement of the receptacles about the track below the nozzles 30 and 32. As each receptacle passes below the nozzle 30, it receives therefrom a certain amount of the regenerating solution, which solution then flows back through the following receptacles to a point above the catch basin 29, where the partial tilting of the particular receptacle then above such basin causes the solution to flow from the receptacles into the basin, and, as each receptacle subsequently passes below the nozzle 32, it receives therefrom a quantity of wash water, which water then flows back through the following receptacles, causing the regenerating solution therein to be first diluted and then washed completely from the zeolites in the receptacles, the wash water flowing back through the receptacles with the solution to the point above the catch basin where it is discharged into the sewer. When the receptacles pass beyond the nozzle 32, the zeolites contained therein are regenerated to the desired extent, and, when the receptacles reach the nozzle 34, they are wholly tilted and the stream of hard water from the nozzle 34 washes the zeolites out of the receptacles and into the trough 36, from which the mixture of hard water and regenerated zeolites descend into the stack 13, where the softening of the water is effected in the manner previously described.

The regeneration of the zeolites is carried on in accordance with the counter-current principle in that the exhausted zeolites in the receptacles 25 come into contact first with the nearly exhausted solution which has already been in contact, further up the inclination in preceding receptacles, with other exhausted zeolites, and the nearly regenerated zeolites, further up the inclination in preceding receptacles, come into contact with the most active solution, whereby a complete regeneration of the zeolites is assured and the base exchange properties of the solution are used to the fullest extent possible.

I have found that a larger amount of calcium and magnesium is removed from the zeolites by each unit of the regenerating solution when the zeolites are relatively exhausted, and economy may accordingly be effected in the use of the regenerating solution by not bringing into contact with the zeolites sufficient solution to completely regenerate the same but only enough to react with the most easily removable portions of the calcium and magnesium. If sufficient solution be passed through a quantity of exhausted zeolites to completely regenerate the same, approximately 3/4 of the calcium and magnesium will be exchanged for sodium and carried off by the first 1/3 of the solution. The remaining 1/4 of the calcium and magnesium is relatively difficult to remove, and economy in time and materials may be effected by not attempting to remove the same but by re-using the zeolites in a still partially exhausted condition. My method of counter-current regeneration lends itself particularly to this economy because the quantity of zeolites passing in one direction can be increased and the quantity of solution passing in the other direction can be decreased, thereby bringing about that degree of regeneration of the zeolites which is most economical, while at the same time uniformly regenerating a sufficient quantity of the zeolites to soften while in partially exhausted condition the desired quantity of water.

The amount of regenerating solution flowing from the nozzle 30 into each receptacle may be proportionately controlled with respect to the amount of hard water flowing from the nozzle 34 into the apparatus by means of a Venturi tube 39 adjacent the nozzle 34 which is operatively associated with a pressure actuated valve 40 adjacent the nozzle 30, and the amount of hard water flowing through the nozzle 34 may in turn be controlled by means of a valve 41 which is actuated by a float mechanism 42 in the casing 10.

The operation of that form of the apparatus illustrated in Figs. 1 to 5 inclusive, may be summarized briefly as follows:

The hard water and active zeolites are introduced into the top of the stack 13 and the softening of the water is effected in the stack during the downward movement of the mixture therein. When the mixture emerges from the bottom of the stack the softened water moves upwardly in the casing and leaves the same through the conduit 14, and the exhausted zeolites collect in the bottom of the casing and are removed therefrom by the injector 17 which discharges such zeolites into the dividing tank 16. From the tank 16 the exhausted zeolites are discharged into the receptacles 25 of the conveyor, and the receptacles carry the zeolites first through a flow of regenerating solution and then through a flow of wash water. After the zeolites in the receptacles have been regenerated by such treatment, the receptacles tilt below the hard water inlet 34, (Fig. 2) and the hard water and zeolites flow together through the trough 36 and into the top of the stack 13, where the softening is effected.

That form of the invention illustrated in Fig. 6 will now be described.

The water-softening portion of the apparatus includes a casing 43 having a conical bottom 44 which terminates centrally in a valved outlet 45. A hard water conduit 46 enters the casing 43 adjacent the bottom of the same and is therein provided with a distributor head 47, and a soft water conduit 48 leaves the casing 43 adjacent the top of the same. The exhausted zeolites are withdrawn from the casing through the outlet 45, and, after being regenerated by the zeolite-regenerating portion of the apparatus hereinafter described, are returned to the casing for re-use through a conduit 49.

The softening of the water is effected in the apparatus by an upward flow of the water through the zeolites, as distinguished from a downward flow. In softening water heretofore, a downward flow of the water has been almost universally used for the reason that, when an upward flow is used, the bed of zeolites becomes channeled and loses its effectiveness. A downward flow, however, is not entirely satisfactory for the reason that the bed soon becomes packed in use and increasing pressure is required to force the water through the same. This difficulty is particularly pronounced in cases where green sand, which packs badly, is used, or where a thick bed is employed for the purpose of permitting longer runs between periods of regeneration.

I have discovered that highly efficient results may be had by an upward flow of the water if the velocity of the flow is such that the zeolites, instead of remaining in a solid filter-like bed, are caused to expand and assume a diffused state of suspension by the velocity of the flow, in which state of suspension the volume of the bed may be approximately doubled. The water-softening portion of the apparatus illustrated in Fig. 6 is designed to operate in accordance with my novel process for softening upwardly.

The bed of zeolites in the casing 43 fills the bottom of the same, when the apparatus is not in operation, to a point above the distributor head 47, but, when the apparatus is in operation, the water is caused to flow from the distributor head at a velocity sufficient to expand the bed of zeolites above the distributor head and maintain the same in an entirely diffused state of suspension. This action on the bed prevents channelling of the same, and brings all of the zeolite grains into complete surface contact with the water. By this process the capacity of the zeolites for softening water is rendered wholly available, the complete softening of the water continues until the bed is entirely exhausted, a bed of increased thickness is possible without necessitating any substantial increase in the pressure needed to force the water through the bed, and all packing of the bed, with its attendant difficulties, is eliminated.

The zeolite-regenerating portion of the apparatus is somewhat similar to that disclosed in the first form of the invention in that it embodies a similar conveyor 24 composed of a plurality of serially linked wheeled receptacles 25 mounted on a circular track 26. The receptacles pass first under the outlet 45 of the casing 43, where they receive the exhausted zeolites, then to a point below a nozzle 50 of a regenerating solution tank 51, where the zeolities in the receptacles are immersed in the solution, then up an inclination to a point below a nozzle 52 where a stream of water flows into the receptacles and washes the solution from the zeolites, and then to a point below a nozzle 53 where the receptacles tilt in sequence and another stream of water flows into the same and washes therefrom the regenerated zeolites. The zeolites are washed from the receptacles into a receiving tank 54, and are elevated from such tank in the conduit 49 to the casing 43 by means of an injector nozzle 55 on the end of a water conduit 56. The regenerated zeolites are discharged from the upper end of the conduit 49 over the top of the zeolite bed. By placing the most active zeolites at the top of the bed and the nearly exhausted or entirely exhausted zeolites just above the distributor head 47, the hard water first comes into contact with the nearly exhausted zeolites and attains a reaction from such zeolites which would not be had were the water first brought into contact with the nearly exhausted zeolites when in a partially softened condition, and the softened water, before leaving the vicinity of the zeolites, comes into contact with the most active zeolites, whereby a thorough softening of the water is had.

In the ordinary zeolite softener where the bed is regenerated in place, or without removing the same from the container, the bed is customarily composed of zeolite grains of wide variation in size, as for instance between the limits of a 20 and 60 mesh screen, and such range is not objectionable. I have found it advantageous, particularly in apparatus of the type disclosed where the bed is put in suspension during the softening operation and where zeolites are withdrawn for regeneration from below the softening zone, to use in each apparatus, grains of approximately the same size, as for instance within a range of ten mesh as against a range of forty or fifty mesh in the ordinary practice. I have also found it advantageous in softeners of the type where the bed is regenerated in place in the usual manner but where the softening is accomplished by an upward flow of the water through the bed, to use grains of approximately uniform size in each bed. In either type of apparatus grains of different size may be used in different beds.

I have found that the delivery of softened water from apparatus operating in accordance with my upward-flow principle may be varied as desired to conform generally with varied rates of consumption, and without changing the proportions of the apparatus and of the contained bed. I accomplish the variation by using zeolite grains of uniformly small size when a small delivery is desired, and zeolite grains of uniformly large size when a rapid delivery is desired.

In the process and apparatus herein disclosed for regenerating the zeolites, the regenerating solution washed from the regenerated zeolites by the flow of washing and diluting water is fed by such flow to the following zeolites undergoing regeneration, and a great saving is thus effected in the use of the regenerating solution since any of the solution not used to its fullest extent is brought into contact with other zeolites to complete its action.

I claim:

1. Apparatus of the class described, including a structure having a liquid passage therein extending first downwardly and then upwardly, means for permitting introduction of the liquid to be treated and the active zeolites into the passage adjacent the top of the downwardly extending portion thereof, means for permitting withdrawal of the exhausted zeolites from the passage adjacent the bottom of the downwardly extending portion thereof, and means for permitting withdrawal of the treated liquid from the passage adjacent the top of the upwardly extending portion thereof.

2. Apparatus of the class described, including a casing, a stack opening at its lower end into the casing adjacent the bottom thereof, means for permitting introduction of the liquid to be treated and the active zeolites into the stack adjacent the top thereof, means for permitting withdrawal of the exhausted zeolites from a point in the casing adjacent the bottom thereof, and means for permitting withdrawal of the treated liquid from the casing adjacent the top thereof.

3. Apparatus of the class described, including a casing, a stack disposed within the casing with its lower end opening near the bottom thereof, an inlet in the stack near the top thereof for introduction of the liquid to be treated and the active zeolites, an outlet in the casing near the bottom thereof for withdrawal of the exhausted zeolites, and another outlet in the casing near the top thereof for withdrawal of the treated liquid.

4. Apparatus of the class described, including a cylindrical casing having a tapering bottom, a cylindrical stack disposed centrally within the casing with its lower end opening near the bottom thereof, an inlet in the stack near the top thereof for introduction of the liquid to be treated and the active zeolites, an outlet in the casing near the bottom thereof for withdrawal of the exhausted zeolites, and another outlet in the casing near the top thereof for withdrawal of the treated liquid.

5. Apparatus of the class described, including a structure having a liquid passage therein extending first downwardly and then upwardly, means for permitting introduction of the liquid to be treated and the active zeolites into the passage adjacent the top of the downwardly extending portion thereof, means for permitting withdrawal of the exhausted zeolites from the passage adjacent the bottom of the downwardly extending portion thereof, means for permitting withdrawal of the treated liquid from the passage adjacent the top of the upwardly extending portion thereof, means to convey the zeolites from their point of withdrawal to their point of reentrance, and means to regenerate the zeolites intermediate such points.

6. Apparatus of the class described, including a casing, a stack opening at its lower end into the casing adjacent the bottom thereof, means for permitting introduction of the liquid to be treated and the active zeolites into the stack adjacent the top thereof, means for permitting withdrawal of the exhausted zeolites from the casing adjacent the bottom thereof, means for permitting withdrawal of the treated liquid from the casing adjacent the top thereof, means to convey the zeolites from their point of withdrawal to their point of reentrance, and means to regenerate the zeolites intermediate such points.

7. Apparatus of the class described, including a casing, a stack disposed within the casing with its lower end opening near the bottom thereof, an inlet in the stack near the top thereof for introduction of the liquid to be treated and the active zeolites, an outlet in the casing near the bottom thereof for withdrawal of the exhausted zeolites, another outlet in the casing near the top thereof for withdrawal of the treated liquid, means to convey the zeolites from their point of withdrawal to their point of reentrance, and means to regenerate the zeolites intermediate such points.

8. Apparatus of the class described, including a cylindrical casing having a tapering bottom, a cylindrical stack disposed centrally within the casing with its lower end opening near the bottom thereof, an inlet in the stack near the top thereof for introduction of the liquid to be treated and the active zeolites, an outlet in the casing near the bottom thereof for withdrawal of the exhausted zeolites, another outlet in the casing near the top thereof for withdrawal of the treated liquid, means to convey the zeolites from their point of withdrawal to their point of reentrance, and means to regenerate and wash the zeolites while in transit intermediate such points.

9. Apparatus of the class described, including a liquid-treating structure having means for permitting introduction of the liquid to be treated and the active zeolites, and means for permitting withdrawal of the treated liquid; and means for regenerating the zeolites exhausted in the liquid-treating structure, including a conveyor, an outlet from the structure at one point in the movement of the conveyor for feeding the exhausted zeolites to the conveyor, means at another point for feeding regenerating solution to the zeolites on the conveyor, and means at another point for removing from the conveyor the then regenerated zeolites.

10. Apparatus of the class described, including a liquid-treating structure having means for permitting introduction of the liquid to be treated and the active zeolites, and means for permitting withdrawal of the treated liquid; and means for regenerating the zeolites exhausted in the liquid-treating structure, including a conveyor, an outlet from the structure at one point in the movement of the conveyor for feeding the exhausted zeolites to the conveyor, means at another point for feeding regenerating solution to the zeolites on the conveyor, means at another point for feeding wash water to the zeolites on the conveyor, and means at another point for removing from the conveyor the then regenerated zeolites.

11. Apparatus for regenerating the zeolites of an associated liquid-treating apparatus, including a conveyor, means at one point in the movement of the conveyor for feeding the exhausted zeolites to the conveyor, means at another point for feeding regenerating solution to the zeolites on the conveyor, and means at another point for removing from the conveyor the then regenerated zeolites.

12. Apparatus for regenerating the zeolites of an associated liquid-treating apparatus, including a conveyor, means at one point in the movement of the conveyor for feeding the exhausted zeolites to the conveyor, means at another point for feeding regenerating solution to the zeolites on the conveyor, means for feeding wash water to the zeolites on the conveyor, and means at another point for removing from the conveyor the then regenerated zeolites.

13. Apparatus for regenerating the zeolites of an associated liquid-treating apparatus, including a conveyor movable up an inclination during a portion of its movement, means for effecting a flow of regenerating solution through the conveyor while moving up the inclination, means for diverting the flow from the conveyor, means for feeding the exhausted zeolites to the conveyor in advance of such flow, and means for discharging the regenerated zeolites from the conveyor beyond such flow.

14. Apparatus for regenerating the zeolites of an associated liquid-treating apparatus, including an endless trough-like conveyor movable in a generally circular path and up an inclination during a portion of its circuit, means for effecting a flow of regenerating solution through the conveyor while moving up the inclination, means for diverting the flow from the conveyor near the bottom of the inclination, means for feeding the exhausted zeolites to the conveyor in advance of such flow, and means for discharging the regenerated zeolites from the conveyor beyond such flow.

15. Apparatus for regenerating the zeolites of an associated liquid-treating apparatus, including a trough-like conveyor composed of a plurality of independently tiltable sections, a guideway along which the sections move, means at one point in the movement of the sections for feeding the exhausted zeolites thereto, means at another point for feeding regenerating solution to the zeolites in the sections, and means at another point for tilting the sections in sequence to remove therefrom the then regenerated zeolites.

16. Apparatus for regenerating the zeolites of an associated liquid-treating apparatus, including a trough-like conveyor composed of a plurality of independently tiltable sections, an endless guideway up a portion of which the sections move at an inclination, means at one point in the movement of the sections for feeding the exhausted zeolites thereto, means at another point for feeding regenerating solution to the zeolites in the sections, and means at another point for tilting the sections in sequence to remove therefrom the then regenerated zeolites.

17. Apparatus for regenerating the zeolites of an associated liquid-treating apparatus, including an endless trough-like conveyor composed of a plurality of independently tiltable sections, an endless guideway up a portion of which the sections move at an inclination, means at one point in the movement of the sections for feeding the exhausted zeolites thereto, means at another point for feeding regenerating solution to the zeolites in the sections, means at another point for feeding wash water to the zeolites in the sections, means at another point adjacent the bottom of the inclination for partially tilting the sections in sequence to remove from the zeolites therein the regenerating solution and wash water, and means at another point for fully tilting the sections in sequence to remove therefrom the then regenerated zeolites.

18. In a zeolite apparatus, a casing, means for introducing hard water and regenerated zeolites, means for mixing the hard water and zeolites upon admission to the casing to form a suspension, means for carrying the suspension through the casing, means for separating the exhausted zeolite and the soft water and means for removing the separated zeolites and water without the casing.

19. Apparatus of the class described, including a casing, a downwardly-extending central passage opening at its lower end into the casing adjacent the bottom thereof, means for permitting introduction of the liquid to be treated and the active zeolites into the passage adjacent the top thereof, means for permitting withdrawal of the exhausted zeolites from the casing adjacent the bottom thereof, and another means for permitting withdrawal of the treated liquid from the casing at another point in the casing.

20. In a zeolite apparatus, a casing adapted to contain exhausted zeolites, a conduit the inlet of which is adapted to be embedded in the exhausted zeolites, injector means positioned in the inlet of said conduit, means for forcing a stream of zeolite-transferring liquid through said injector means, a receiver for the transferred zeolites positioned along said conduit, means for discharging the zeolites from the conduit into a portion of the receiver adjacent the bottom thereof, means for removing the zeolites from the receiver at a point below such discharge point, means for removing the separated impurities at a point above the discharge point, and another means above this last mentioned means and adjacent the top of the receiver for removing the liquid.

21. Apparatus of the class described, including a liquid-treating structure having means for permitting introduction of the liquid to be treated and the active zeolites, and means for permitting withdrawal of the treated liquid; and means for regenerating the zeolites exhausted in the liquid-treating structure, including a conveying means, an outlet from the structure at one point for feeding the exhausted zeolites to the conveying means, means at another point for feeding regenerating solution to the zeolites in the conveying means, and means at another point for removing from the conveying means the then regenerated zeolites.

22. In a zeolite apparatus, a casing adapted to contact zeolites with water to be softened, a receiver for the exhausted zeolites, a conduit communicating with said casing and said receiver adapted to convey the zeolites from the latter to the former, means for forcing a stream of zeolite-transferring liquid through said conduit to the receiver, means for discharging the zeolites from the conduit into a portion of the receiver adjacent the bottom thereof, means for removing the zeolites from the receiver at a point below such discharge point to be returned to the casing, means for removing the separated impurities at a point above the discharge point, and another means above this last mentioned means and adjacent the top of the receiver for removing the liquid.

23. In a zeolite apparatus, a casing, a vertical interior passage therein, means for introducing hard water and regenerated zeolites into the top of the passage, means for forming a suspension of the regenerated zeolites and the hard water, means for carrying said suspension through the passage, means for separating the soft water and exhausted zeolites in the lower part of the casing, and means for preparing the exhausted zeolites for reuse.

24. Apparatus of the class described, including a casing having an interior liquid passage herein extending downwardly, means for permitting introduction and mixture of the liquid to be treated and the active zeolites adjacent the top of the passage, means for permitting withdrawal of the exhausted zeolites from the passage adjacent the bottom of the casing, and other means for permitting withdrawal of the treated liquid from the passage.

25. In a zeolite apparatus, a casing, a bed of used zeolites in the lower part of said casing means for introducing a mixture of hard water and fresh zeolites into the upper part of the casing, means for conducting said mixture to the lower part of said casing, means for separating the soft water and the used zeolites, and means for withdrawing the soft water, the separating means being positioned right above the bed so that the separated zeolites will deposit upon said bed.

26. In a zeolite apparatus, a casing, a bed of used zeolites in the bottom of the casing, means for introducing a mixture of hard water and fresh zeolites into the upper part of the casing, means for conducting said mixture vertically downwardly through one portion of the casing until it reaches a point adjacent the bottom thereof, means for separating the zeolites and water at such point, means for conducting the separated zeolites downwardly to the bed of used zeolites and means for conducting the softened water upwardly through another portion of the casing.

In testimony whereof I have hereunto subscribed my name.

WALTER H. GREEN.